United States Patent
Haltof

[11] Patent Number: 5,478,037
[45] Date of Patent: Dec. 26, 1995

[54] PULL RELEASE BRACKET

[76] Inventor: Garry P. Haltof, 1470 E. Avenue, Rochester, N.Y. 14610

[21] Appl. No.: 262,623

[22] Filed: Jun. 20, 1994

[51] Int. Cl.⁶ .................................................. A47B 96/06
[52] U.S. Cl. ........................... 248/221.11; 248/309.1; 379/455
[58] Field of Search .................. 248/222.1, 221.3, 248/309.1; 379/426, 433, 446, 445, 449, 454, 455; 224/42.42

[56] References Cited

U.S. PATENT DOCUMENTS

| | | |
|---|---|---|
| 3,889,907 | 6/1975 | Davis et al. |
| 4,517,420 | 5/1985 | Haskins |
| 4,588,866 | 5/1986 | Monti |
| 4,718,525 | 1/1988 | Boda .................... 248/222.1 |
| 4,741,034 | 4/1988 | Errichiello ................ 379/433 |
| 4,782,528 | 11/1988 | Inoue ...................... 379/455 |
| 4,907,265 | 3/1990 | Uchino ................... 379/426 X |
| 4,969,187 | 11/1990 | Hattori et al. |
| 4,969,187 | 11/1990 | Hattori ..................... 379/433 |
| 5,069,407 | 12/1991 | Williams ................ 248/221.3 |
| 5,113,436 | 5/1992 | Harvela et al. |
| 5,142,573 | 8/1992 | Umezawa ............... 379/441 X |
| 5,157,722 | 10/1992 | Hollowed et al. |
| 5,179,590 | 1/1993 | Wang ..................... 224/42.42 |
| 5,187,744 | 2/1993 | Richter .................. 224/42.42 |
| 5,189,698 | 2/1993 | Hakanen ................ 379/454 X |
| 5,230,016 | 7/1993 | Yasuda |
| 5,253,292 | 10/1993 | Fluder et al. |
| 5,282,246 | 1/1994 | Yang ........................ 379/455 |
| 5,295,649 | 3/1994 | Lee ...................... 248/309.1 X |
| 5,305,381 | 4/1994 | Wang .................... 379/426 X |
| 5,383,091 | 1/1995 | Snell ..................... 379/455 X |
| 5,392,350 | 2/1995 | Swanson ............... 379/454 X |
| 5,410,597 | 4/1995 | Kepley .................... 379/449 |

FOREIGN PATENT DOCUMENTS

| | | | |
|---|---|---|---|
| 2241132 | 8/1991 | United Kingdom | 379/455 |
| 2274975 | 8/1994 | United Kingdom | 379/454 |

Primary Examiner—J. Franklin Foss
Attorney, Agent, or Firm—Eugene Stephens & Associates

[57] ABSTRACT

A bracket for a hand holdable instrument has a pull release latch with gripper surfaces arranged alongside the instrument so that a grip on the gripper surfaces can first release the latch and then slide into engagement with the unlatched instrument for pulling it away from the bracket. This lets a hand reaching for the instrument straddle the instrument, pull on the grippers to release the latch, and slide smoothly into engagement with the instrument for pulling the instrument in the same direction away from the bracket.

30 Claims, 5 Drawing Sheets 5,478,037

PULL RELEASE BRACKET

FIELD OF THE INVENTION

This invention involves a release mechanism for removing a hand holdable instrument from a support bracket.

BACKGROUND

Support brackets are widely used for supporting hand holdable instruments, such as telephones, remote controls, and specialized tools. The brackets often include a latch and a release mechanism so that the instrument can be latched in place when supported by the bracket, and can be removed from the bracket by releasing the latch.

Such brackets for hand holdable instruments suffer from a variety of problems. These include: complexity and expense, number of parts involved, inconvenience in use, and excessive or awkward movements that are required for actuating a latch release to remove the instrument from the bracket. Dissatisfaction with present support brackets for hand holdable instruments has led to the development of the bracket disclosed in this application, which aims to overcome as many as possible of the problems experienced by previous brackets.

SUMMARY OF THE INVENTION

A hand holdable instrument bracket according to the invention has a latch release arranged so that a hand gripping the latch to release it can also grip the instrument as it comes unlatched from the bracket. The result is one smooth hand motion that releases the latch and grips and pulls away the instrument. Otherwise, the bracket holds the instrument in a latched support position from which it is free to move in only one direction, and the latch holds the instrument against moving in that direction. The instrument is preferably biased toward the removal direction, and the latch is biased toward a latch position. Releasing the latch overcomes the latch bias and unlatches the instrument, which starts moving in the removal direction and is promptly gripped by the hand releasing the latch which continues pulling the instrument in the removal direction for removal from the bracket in one smooth motion.

DRAWINGS

FIG. 1 is a partially schematic front view of a bracket with a pull release latch for holding an instrument according to the invention.

FIGS. 2, 3, and 4 are partially schematic and partially cut-away side views of the latch and bracket of FIG. 1 showing an instrument latched position in FIG. 2, an instrument unlatched position in FIG. 3, and an instrument removal position in FIG. 4.

DETAILED DESCRIPTION

Figure 1:
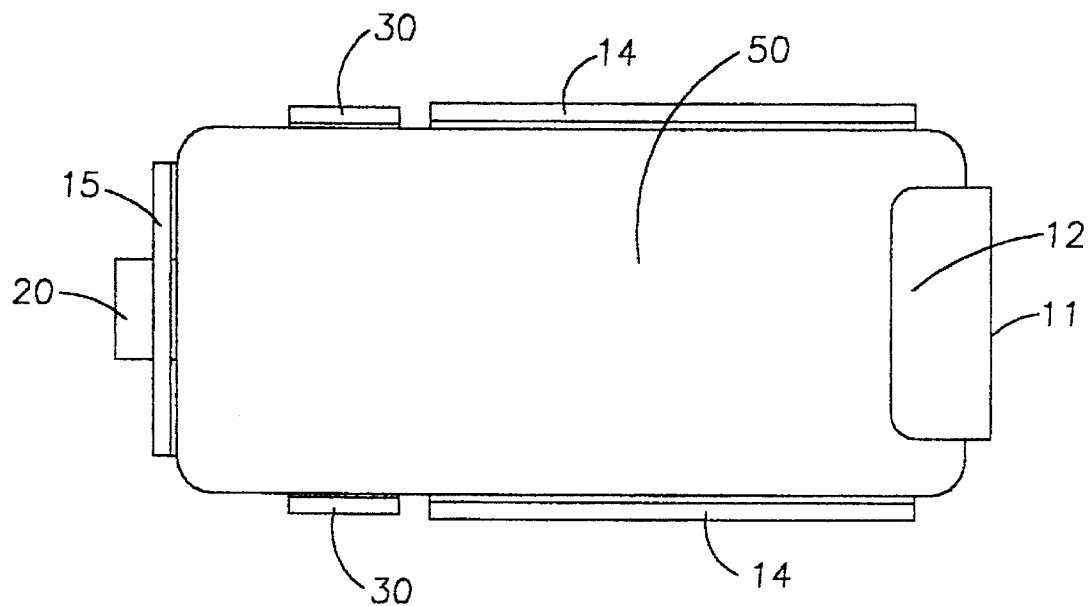
Figure 2:
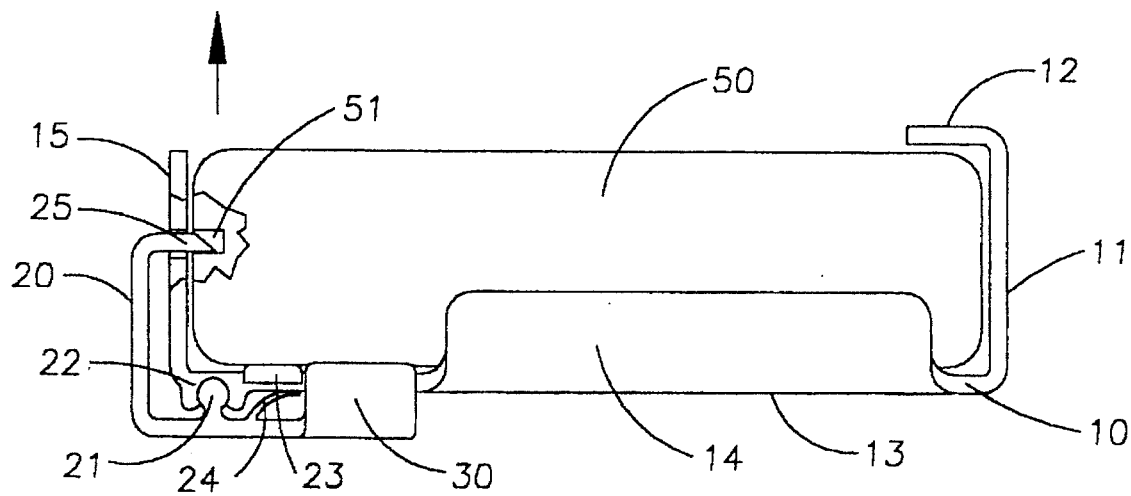

FIGS. 1 and 2 schematically show an instrument holding bracket 10 with a pull release latch 20 according to the invention. The bracket 10 holds the instrument 50 in a supported position from which it can escape in only one direction, as shown by the arrow in FIG. 2. The desirable characteristics of the bracket 10 are its ability to hold instrument 50 securely in a convenient position, to keep instrument 50 from falling out of bracket 10 accidentally, to limit the removal of instrument 50 to a single direction, and to release instrument 50 when required.

Bracket 10 includes a latch 20 that latches instrument 50 in the supported position shown in FIGS. 1 and 2. Latch 20 is also involved in the release motion that allows instrument 50 to be removed quickly and easily with one hand from a latched position on bracket 10.

Figure 3:
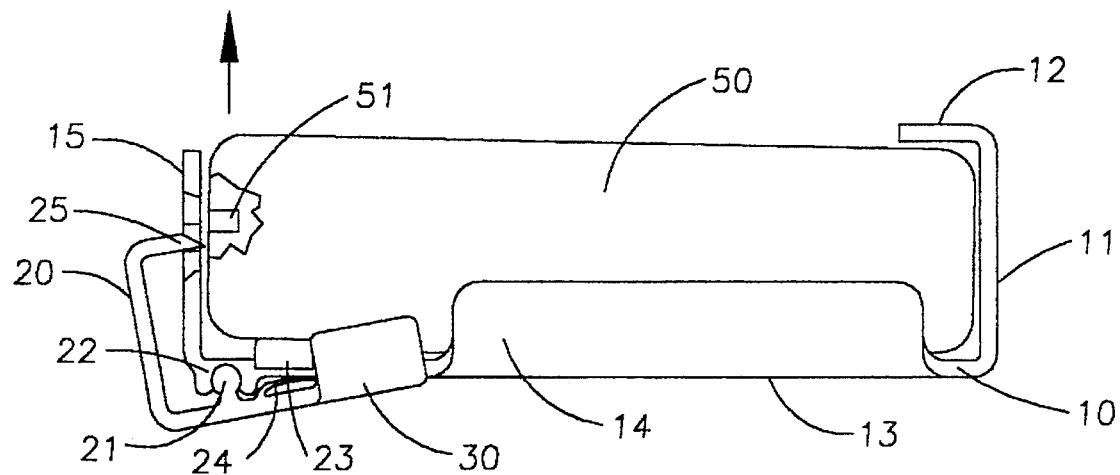
Figure 4:
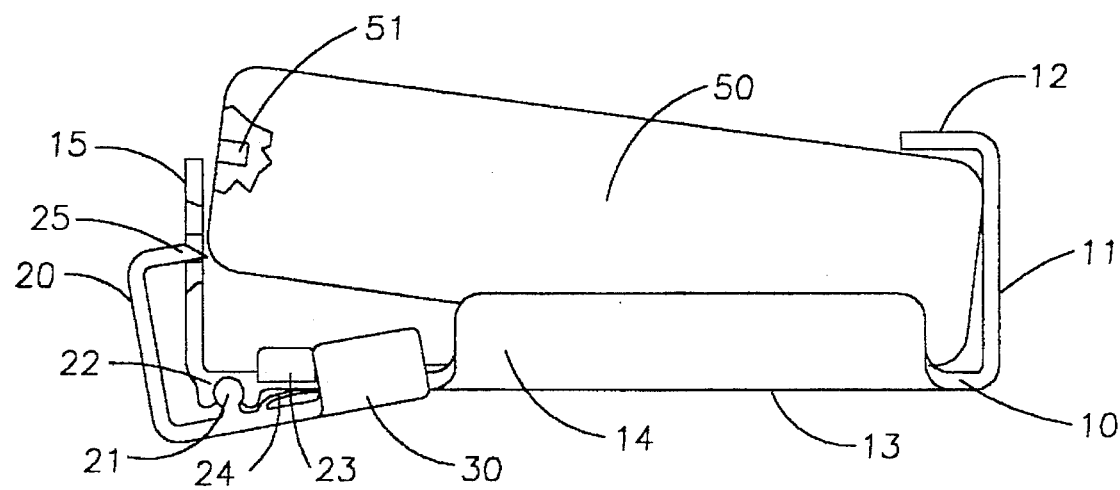

For holding instrument 50 and limiting its removal motion, bracket 10 includes a base or fixed end region 11 that has a fixed holder 12 wrapped around one end region of instrument 50. Bracket 10 also has a bottom 13 and side walls 14 that help retain instrument 50 in place in a supported position. A bracket end wall 15, opposite end wall 11, extends over the latched end of instrument 50 so that the removal direction of instrument 50 from bracket 10 is limited to movement in the direction of the arrow in FIG. 2, as illustrated in FIGS. 3 and 4.

Latch 20 is pivotally mounted on bracket 10, preferably by means of a snap-in pivot 21 formed on an axis extending across latch 20 and having a snap-fit interconnection with a groove 22 arranged along a similar axis on bracket 10. This lets latch 20 pivot between the latch position shown in FIG. 2 and the unlatched position shown in FIGS. 3 and 4.

Latch 20 has a latch element or catch 25 that hooks or interlocks with recess 51 in instrument 50. Catch 25 can also interlock and latch with a projection formed on instrument 50 or with an outward facing surface of instrument 50. Preferably, the surface of instrument 50 that is engaged by latch element 25 is perpendicular to the removal direction so that pulling on instrument 50 cannot cam latch catch 25 out of latched position with instrument 50. The catch 25 on latch 20 is preferably aligned in the removal direction with latch pivot 21. In other words, a plane passing through the pivot axis of latch 21 and extending to intersect catch 25 is generally aligned with the instrument removal direction indicated by the arrow in FIGS. 2, 3, and 7. This also ensures that pulling on instrument 50 cannot cam catch 25 into an unlatched position.

Latch 20 is also biased into the latched position shown in FIG. 2, and this can be accomplished in several ways. Springs or resilient elements are preferred, and as shown in FIGS. 2–4, a resilient leaf spring 24 is formed on latch 20 to engage the underside 13 of bracket 10.

Instrument 50 is also preferably biased toward the removal direction shown by the arrows in FIGS. 2 and 3. This is accomplished in the embodiment illustrated in FIGS. 2–4 by an elastic pad 23 that is resiliently compressed when instrument 50 is pushed into the latched position shown in FIG. 2. When latch 20 is unlatched, as shown in FIG. 3, resilient element 23 moves instrument 50 out of the latched position toward the removal direction, as slightly exaggerated in FIG. 3. Once unlatched, instrument 50 moves out of latch position and cannot be relatched without being pushed back into bracket 10. The movement from the latch position caused by resilient element 23, which could also be a leaf spring or other spring arranged on bracket 10, starts instrument 50 moving toward the removal direction so that the remainder of the instrument removal can follow smoothly from the movement started by bias element 23.

Bracket 20 also includes a grip surface 30 that can be gripped by a thumb or finger for moving latch 20 to an unlatched position, for releasing instrument 50. A gripper or gripping surface 30 of latch 20 is preferably arranged on each opposite side of bracket 10, to straddle bracket 10 and instrument 50. Gripper surfaces 30 are also preferably arranged on an opposite side of pivot 21 from latch element 25. This places gripper surfaces 30 alongside a mid-region of instrument 50 as illustrated, while latch element 25 preferably engages an end region of instrument 50. This is not essential, however, because manually engageable gripper surfaces can be arranged on the same side of pivot 21 as catch 25. Gripper surfaces 30 are also preferably arranged as close as practical to the opposite sides of instrument 50 so that only a small gap exists between the outer surfaces of grippers 30 and the sides of instrument 50. This helps a thumb and finger engaging grippers 30 to slide smoothly from grippers 30 onto the sides of instrument 50, as the instrument is released. A side wall 14 of bracket 10 can intervene between grippers 30 and instrument 50, as illustrated in FIGS. 6–8 or bracket 10 can be formed so that no wall intervenes between grippers 30 and the opposite sides of instrument 50, as illustrated in FIGS. 1–5.

When arranged as preferred, gripper surfaces 30 can be engaged by a thumb and finger of a hand straddling instrument 50 and pulled to the position of FIG. 3 to release latch 20 and initiate removal motion of instrument 50 from its latched position. Then, the thumb and finger engaging grippers 30 can slide from the surfaces of grippers 30 into engagement with the sides of instrument 50 to convert the grip on surfaces 30 into a grip on instrument 50 as it moves out of latched position. The grip on instrument 50 can continue the pulling motion that was started on gripper surfaces 30, to pull instrument 50 further in the removal direction, as shown in FIG. 4. The sensation for a person removing instrument 50 from bracket 10 is one of straddling the instrument with a grip on surfaces 30, where the instrument is trapped under the straddling hand. Then the hand pulls on gripper surfaces 30 until they stop moving and continues the same pulling motion, with the same squeeze of a thumb and finger as these slide off of gripper surfaces 30 and onto the sides of instrument 50, so that instrument removal is experienced as a single pulling motion. The pulling grip initially releases latch 20 and then slides onto the released instrument, which is automatically gripped and moved in the same direction as used to release 20. The motion is convenient, fast, and effective.

Figure 5:
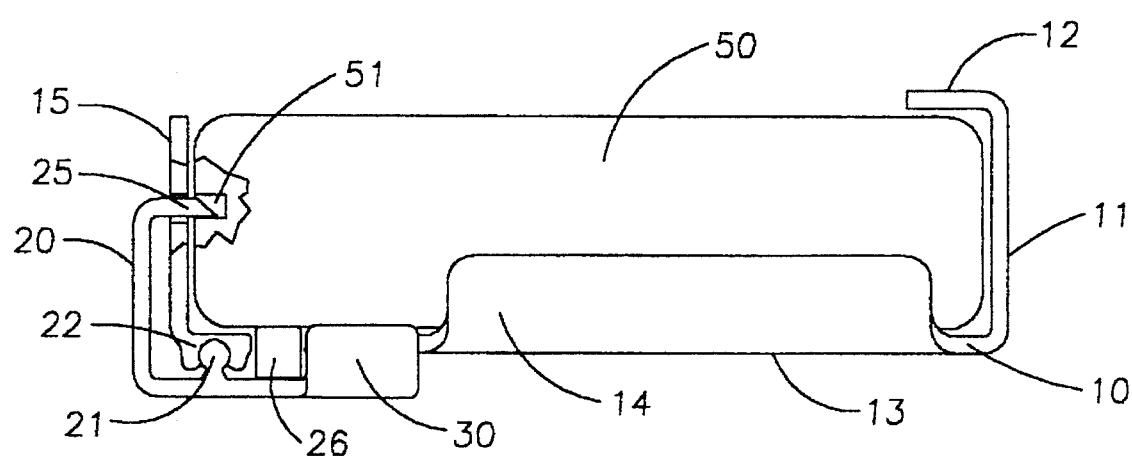
FIG. 5 is a partially schematic side view of a pull release latch and bracket similar to the one shown in FIGS. 1–4, but differing in the way that the latch and the instrument are biased.
Figure 6:
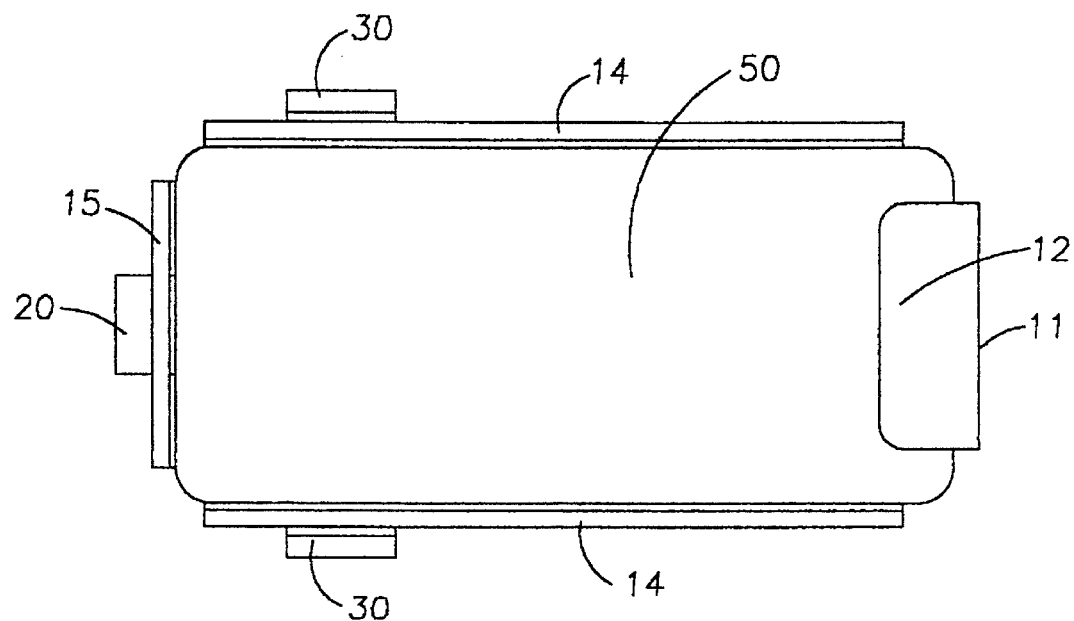
FIG. 6 is a partially schematic front view of an alternative bracket having a side wall extending between an instrument held in the bracket and a pull release latch according to the invention.
Figure 7:
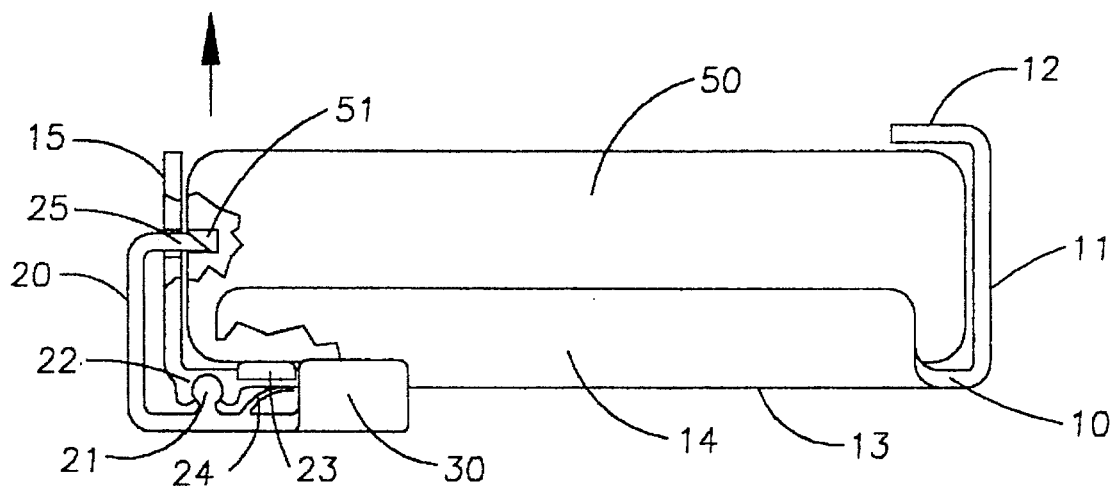
FIG. 7 is a partially schematic and partially cut-away side view of the latch and bracket of FIG. 6 showing the instrument in latched position.
Figure 8:
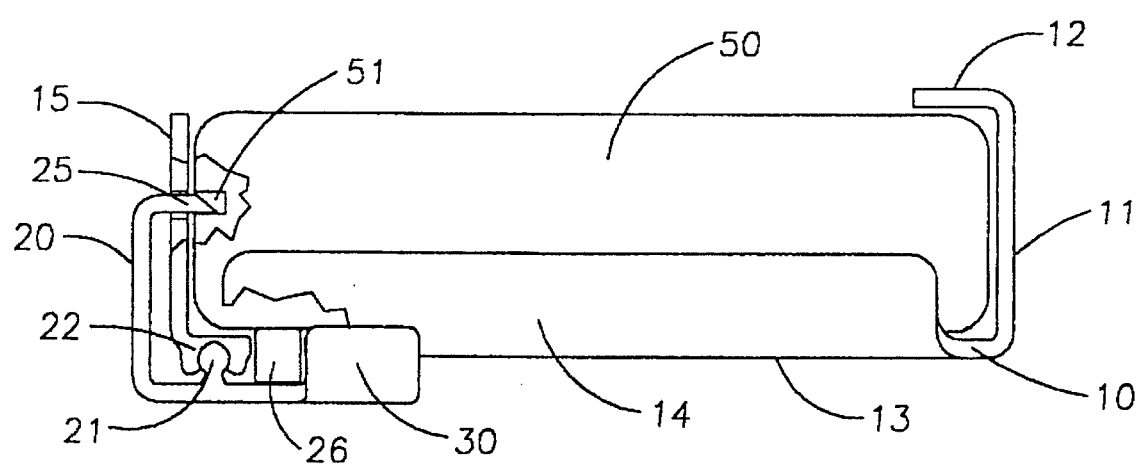
FIG. 8 is a partially schematic and partially cut-away side view of the latch and bracket of FIG. 6 showing a different way of biasing the latch and the instrument.

The embodiment of FIGS. 5 and 8 is similar to the embodiment of FIGS. 1–4, 6, and 7, but uses a different resilient element 26. Element 26 is a spring or other resilient element arranged on latch 20 and engaging instrument 50 through an opening in bottom 13 of bracket 10. When instrument 50 is pushed into a latched position in bracket 10, it pushes resilient element 26 and latch 20 into latched position as well. Resilient element 26 then provides the bias that pushes instrument 50 out of latched position toward the removal direction, when unlatched as shown in FIG. 3. It also provides the bias that holds latch 20 in the latched position illustrated in FIGS. 5 and 8. Release of latch 20 is done in the same way by pulling on gripper surfaces 30 and then grabbing hold of instrument 50 as it is unlatched.

Latch 20 can have a single gripper surface 30 arranged along one side of instrument 50 so that a hand straddling instrument 50 can engage it directly on one side and can engage a single gripper surface 30 on the other side. A pull on the engaged gripper surface has the similar effect of releasing latch catch 25 and instrument 50, whereupon a finger or thumb engaging surface 30 slides off of the gripper and onto the instrument, to complete its removal from bracket 10.

Latch 20 can have a gripper or finger engageable surface that does not require a pulling motion to release latch 20, providing that the hand engaging the gripper surface to release latch 20 is straddling instrument 50 and can move from the latch gripper surface onto instrument 50, to pull it away from bracket 10 in the removal direction, upon release of latch 20.

Bracket 10 and latch 20 can be made with as few as two components, each of which is preferably injection molded of resin material. If latch 20 is formed with a resilient element 26, shown in FIGS. 5 and 8, it can provide the necessary bias for latching latch 20 and urging instrument 50 from the latched position. Otherwise, a separate bias element 23 for instrument 50, as shown in FIGS. 2–4, 6, and 7, raises the total number of parts to 3. The small number of parts simplifies the cost and assembly of the latch and bracket combination, and yet the assembly is operated conveniently and reliably, with a simple and comfortable motion, for unlatching and removing instrument 50. Returning instrument 50 to a latched position is simply a matter of placing one end of instrument 50 within bracket end 11, and then pushing the latch end of instrument 50 into latched position.

I claim:

1. A pull release bracket for a hand-holdable instrument latched to the bracket and releasable from the bracket in a removal direction, the pull release bracket comprising:

a. a moveable latch is arranged for latching the instrument against movement in the removal direction;

b. the latch has a gripper by which the latch is moveable for unlatching the instrument, and the gripper is disposed alongside the instrument and oriented so that pulling on the gripper to release the latch uses a pulling motion that is generally aligned with the removal direction;

c. the gripper is configured and arranged so that a finger or thumb pulling on the gripper in the pulling motion can slide off the gripper and onto the instrument; add d. a hand straddling the instrument and pulling on the gripper in the pulling motion moves from the gripper and onto the instrument as the instrument is unlatched, so that the hand then holds the unlatched instrument and continues moving with the instrument in the removal direction.

2. The pull release bracket of claim 1 wherein the gripper for the latch is arranged on each opposite side of the instrument and affords a gripper for both a thumb and a finger of the hand straddling the instrument.

3. The pull release bracket of claim 1 wherein the gripper is arranged alongside a mid-region of the instrument, and the latch engages an end region of the instrument.

4. The pull release bracket of claim 1 wherein the latch has a pivot and a catch arranged so that a plane extending through an axis of the pivot and intersecting the catch is aligned with the removal direction.

5. The pull release bracket of claim 1 wherein the latch has a catch, and the gripper and the catch are arranged on opposite sides of a latch pivot.

6. A pull release latch and bracket for releasably retaining a hand-holdable instrument, the pull release latch and bracket comprising:

a. a pivotal mount for the latch on the bracket;

b. a gripper for moving the latch to an unlatched position releasing the instrument;

c. the instrument in its latched position being biased against the latch;

d. the gripper being arranged alongside the instrument so that a thumb or finger engaging and moving the gripper is adjacent a side of the instrument; and e. the gripper being configured so that a thumb or finger moving the gripper to a release position can slide off the gripper and onto the side of the instrument as the instrument is unlatched and moved from its latched position.

7. The pull release latch and bracket of claim 6 wherein the gripper and a latch element for engaging the instrument are arranged on opposite sides of the pivotal mount for the latch.

8. The pull release latch and bracket of claim 6 wherein the latch is biased into latching engagement with the instrument.

9. The pull release latch and bracket of claim 8 wherein a resilient element biasing the instrument provides the latch bias.

10. The pull release latch and bracket of claim 6 wherein the gripper for moving the latch is arranged on each side of the instrument so that a thumb and finger straddling the device can each engage and move the gripper.

11. The pull release latch and bracket of claim 6 wherein the pivot mount for the latch and a latch element for engaging the instrument are aligned with a direction of release of the instrument from the bracket.

12. A combination of a pull release latch and a bracket for supporting a hand holdable instrument, the combination comprising:

a. a pivot interconnecting the latch and the bracket;

b. a resilient element biasing the latch into a latched position;

c. the latch having a catch engaging and latching against a latch surface of the instrument;

d. a gripper having grip surfaces formed on the latch on a side of the pivot opposite from the catch, the gripper being arranged for pivoting the latch against the resilient element for moving the catch to an unlatched position;

e. the grip surfaces being spaced apart by a distance that can be spanned by a thumb and finger grip; and f. the grip surfaces being configured so that a thumb and finger pulling on the grip surfaces to unlatch the catch can slide off the grip surfaces to engage the instrument as it is released by the latch.

13. The combination of claim 12 wherein the grip surfaces are disposed alongside a mid-region of the bracket and the latch element is disposed at an end region of the bracket.

14. The combination of claim 12 wherein the resilient element is formed as part of the latch and is disposed for resiliently engaging the bracket.

15. The combination of claim 12 wherein the pivot provides a snap-fit interconnection between the latch and the bracket.

16. The combination of claim 12 wherein movement of the gripper surfaces for releasing the latch is generally in the direction of movement of the instrument as it is removed from the bracket.

17. The combination of claim 12 wherein the instrument is biased out of its latched position on the bracket.

18. The combination of claim 17 wherein the resilient element provides the bias applied to move the instrument from its latched position.

19. The combination of claim 12 wherein the grip surfaces are disposed on opposite sides of the bracket, and the thumb and finger sliding off the grip surfaces engage opposite sides of the instrument.

20. A pull release latch combined with a bracket that releasably supports a hand holdable instrument, the pull release latch and bracket comprising:

a. the latch being pivotally mounted on the bracket so that a latch element latches the instrument in a supported position on the bracket, and the latch is biased toward a latched position;

b. a latch release gripper formed on an opposite side of a latch pivot from the latch element, the gripper having grip surfaces disposed on opposite sides of the bracket and spaced apart so that a thumb and finger can engage and pull on the grip surfaces to release the latch; and c. the grip surfaces being configured so that the thumb and finger pulling on the grip surfaces to release the latch can slide off the grip surfaces and onto the instrument as it is unlatched from the bracket so that the pulling motion first applied to the grip surfaces is then applied to the instrument to remove the instrument from the bracket as the thumb and finger slide from the grip surfaces onto the instrument.

21. The pull release latch and bracket of claim 20 wherein the grip surfaces are spaced apart by slightly more than the width of the instrument.

22. The pull release latch and bracket of claim 20 wherein a bias tends to move the instrument from the supported position in a removal direction.

23. The pull release latch and bracket of claim 22 wherein the pull direction on the grip surfaces is generally aligned with the movement of the instrument in the removal direction.

24. The pull release latch and bracket of claim 23 wherein the bias for the instrument and a bias for the latch are provided by a resilient element on the latch.

25. A combination latch and bracket for a hand-holdable instrument, the combination comprising:

a. the latch is pivotally mounted on the bracket, is biased into a latching engagement with the instrument, and has a catch for engaging the instrument in a latched position;

b. a plane through a pivot axis of the latch pivot extending in a direction that intersects the catch is generally aligned with the direction of the only movement that allows the instrument to escape from the bracket;

c. the instrument is urged in the removal direction to be biased against the catch; and d. the latch is manually engageable for unlatching the instrument to release the instrument for moving in the removal direction whereupon a hand engaging and unlatching the latch then engages the unlatched instrument for moving the instrument in the removal direction.

26. The combination of claim 25 wherein the engagement of the latch is in the pull direction aligned with the removal direction of the instrument.

27. The combination of claim 25 wherein the catch and an instrument latch surface engaged by the catch are oriented so that pulling on the instrument cannot cam the latch to an unlatched position.

28. The combination of claim 25 wherein hand engagement surfaces of the latch are on opposite sides of the instrument.

29. The pull release bracket of claim 1 wherein a resilient element biases the instrument in the removal direction so that unlatching the latch by pulling on the gripper causes the resilient element to start movement of the instrument in the removal direction.

30. The pull release bracket of claim 29 wherein the resilient element biasing the instrument also biases the latch to a latched position.

* * * * *